(12) United States Patent
Zheng et al.

(10) Patent No.: US 12,378,484 B2
(45) Date of Patent: Aug. 5, 2025

(54) FULL CONVERSION METHOD AND DEVICE FOR PRODUCING LIGHT AROMATIC HYDROCARBONS FROM LIGHT CYCLE OIL

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Junlin Zheng, Shanghai (CN); Xiangdong Jiang, Shanghai (CN); Qi Song, Shanghai (CN); Dejin Kong, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 727 days.

(21) Appl. No.: 17/632,347

(22) PCT Filed: Aug. 4, 2020

(86) PCT No.: PCT/CN2020/106710
§ 371 (c)(1),
(2) Date: Feb. 2, 2022

(87) PCT Pub. No.: WO2021/023172
PCT Pub. Date: Feb. 11, 2021

(65) Prior Publication Data
US 2022/0275294 A1 Sep. 1, 2022

(30) Foreign Application Priority Data
Aug. 5, 2019 (CN) .................. 201910715616.X

(51) Int. Cl.
*C10G 67/14* (2006.01)
*C10G 45/54* (2006.01)
*C10G 65/12* (2006.01)

(52) U.S. Cl.
CPC ............ *C10G 67/14* (2013.01); *C10G 45/54* (2013.01); *C10G 65/12* (2013.01);
(Continued)

(58) Field of Classification Search
CPC ........ C10G 67/14; C10G 45/54; C10G 65/12; C10G 2300/1048; C10G 2300/207;
(Continued)

(56) References Cited

U.S. PATENT DOCUMENTS

| 5,026,472 A | 6/1991 | Hoehn et al. |
| 7,271,303 B1 | 9/2007 | Sechrist et al. |

(Continued)

FOREIGN PATENT DOCUMENTS

| CN | 1955262 A | 5/2007 |
| CN | 101684415 A | 3/2010 |

(Continued)

OTHER PUBLICATIONS

Translation of Zheng (CN105085135A) (Year: 2015).*
(Continued)

*Primary Examiner* — Ekandra S. Miller-Cruz
(74) *Attorney, Agent, or Firm* — Panitch Schwarze Belisario & Nadel LLP

(57) ABSTRACT

Provided are a full conversion process and a device thereof for producing light aromatic hydrocarbon from LCO. The process includes the steps of: subjecting LCO stream to
(Continued)

hydrofining and impurity separation, then performing selective conversion reaction, and separating the mixed aromatic hydrocarbons generated to sequentially separate out light aromatic hydrocarbons such as benzene-toluene and xylene, $C_9A$ aromatic hydrocarbons, $C_{10}A$ aromatic hydrocarbons and a bottom heavy tail oil; feeding the bottom heavy tail oil into a post-saturation selective reactor, subjecting to high-selectivity hydrogenation saturation under the conditions of low temperature and low pressure to provide a product having one benzene ring, and then returning the product back to the selective conversion reactor. The full-cut conversion of producing light aromatic hydrocarbon from LCO is achieved, resulting in the technical effects of high yields of monocyclic aromatic hydrocarbons such as benzene-toluene, xylene, $C_9A$ aromatic hydrocarbons, $C_{10}A$ aromatic hydrocarbons and the like.

10 Claims, 1 Drawing Sheet

(52) U.S. Cl.
CPC ............... *C10G 2300/1048* (2013.01); *C10G 2300/207* (2013.01); *C10G 2400/30* (2013.01)

(58) Field of Classification Search
CPC ........ C10G 2400/30; C10G 2300/4081; C10G 45/52; C10G 47/20; C10G 45/02; C10G 45/44; C10G 2300/1055; C10G 2300/1059; C10G 2300/202; C10G 67/12; Y02P 20/52
USPC ......................................................... 210/790
See application file for complete search history.

(56) References Cited

U.S. PATENT DOCUMENTS

| | | | |
|---|---|---|---|
| 7,384,542 B1 | 6/2008 | Thakkar et al. | |
| 7,641,788 B2 | 1/2010 | Hansen et al. | |
| 7,837,860 B1 | 11/2010 | Hoehn et al. | |
| 8,846,995 B2 | 9/2014 | Yanagawa et al. | |
| 9,365,782 B2 | 6/2016 | Dindi et al. | |
| 2007/0299289 A1* | 12/2007 | Bresler | C07C 5/2708 |
| | | | 585/323 |
| 2009/0200201 A1 | 8/2009 | Chen | |
| 2015/0267130 A1 | 9/2015 | Butley et al. | |
| 2022/0023846 A1* | 1/2022 | Bogdan | B01J 37/08 |

FOREIGN PATENT DOCUMENTS

| | | |
|---|---|---|
| CN | 103041832 A | 4/2013 |
| CN | 103897731 A | 7/2014 |
| CN | 105085135 A | 11/2015 |
| CN | 105316040 A | 2/2016 |
| CN | 105733675 A | 7/2016 |
| CN | 106047404 A | 10/2016 |
| CN | 109777514 A | 5/2019 |
| CN | 110180581 A | 8/2019 |
| EP | 2 630 106 A2 | 8/2013 |
| JP | H7-62355 A | 3/1995 |
| JP | 2010-532753 A | 10/2010 |
| JP | 2012-241174 A | 12/2012 |
| JP | 2014-500859 A | 1/2014 |
| KR | 20060023175 A | 3/2006 |
| KR | 20130040182 A | 4/2013 |
| KR | 20150082270 A | 7/2015 |
| WO | 2012/053848 A2 | 4/2012 |

OTHER PUBLICATIONS

International Search Report (PCT/ISA/210) with an English translation, and Written Opinion (PCT/ISA/237) mailed on Nov. 6, 2020, by the China National Intellectual Property Administration as the International Searching Authority for International Application No. PCT/CN2020/106710. (9 pages).
Office Action issued on Jun. 7, 2023, by the Canadian Intellectual Property Office in counterpart Canadian Patent Application No. 3,149,654 (3 pages).
Extended European Search Report issued Jul. 31, 2023, by the European Patent Office in corresponding European Patent Application No. 20850749.1. (8 pages).
Office Action issued on Feb. 7, 2023, by the Intellectual Property India, Government of India in corresponding Indian Patent Application No. 202247010639, and an English translation of the Office Action. (6 pages).
Office Action issued on Feb. 13, 2024, by the Japanese Patent Office in corresponding Japanese Patent Application No. 2022-507440 and an English translation of the Office Action (10 pages).
Office Action (Request for the Submission of an Opinion) issued on Mar. 28, 2025, by the Korean Patent Office in corresponding KR Application No. 10-2022-7007224, and English translation of the Office Action (21 pages).

* cited by examiner

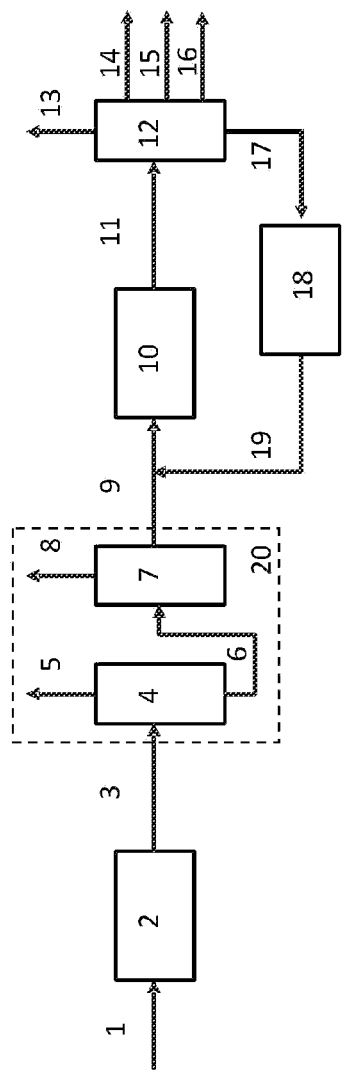

FULL CONVERSION METHOD AND DEVICE FOR PRODUCING LIGHT AROMATIC HYDROCARBONS FROM LIGHT CYCLE OIL

TECHNICAL FIELD

The invention relates to production of light aromatic hydrocarbon in the field of petroleum catalytic cracking, in particular to a process and a device for producing light aromatic hydrocarbon from light cycle oil.

BACKGROUND

Light aromatic hydrocarbons such as benzene, toluene, xylene and the like are important basic organic chemical raw materials, are widely used in the fields of synthetic materials and the like, and are closely related to economic development and daily life of people. At present, the aromatic hydrocarbon source mainly comprises two processing routes: firstly, naphtha is subjected to catalytic reforming and aromatic extraction to provide an aromatic hydrocarbon raw material; and secondly, the byproduct of the ethylene process, namely pyrolysis gasoline, is hydrogenated and extracted to provide an aromatic hydrocarbon raw material.

The light cycle oil (LCO) mainly comprises $C_{11}^+$ alkylbenzene and polycyclic aromatic hydrocarbon. Due to the presence of a large amount of polycyclic aromatic hydrocarbon, the diesel processed by the LCO is poor in economy, and can only be used as fuel oil by some enterprises. Along with the increase in demand of diesel is slowing and slowing, the development of an efficient conversion technology is urgently needed, by which LCO is converted into light aromatic hydrocarbon through hydrocracking reaction, and cost reduction and efficiency improvement of the aromatic hydrocarbon industry are realized through refining and converting.

Currently, the widely adopted LCO upgrading means comprise hydrofining, hydro-upgrading and light oil type hydrocracking. Hydrofining of diesel comprises hydrogenation saturation of olefin, desulfurization, denitrification and partial saturation of aromatic hydrocarbon under the condition of medium or low pressure to improve its colour and stability. However, regarding the LCO obtained from a catalytic device for processing inferior raw materials, hydrofining is insufficient to meet the requirements of the product on cetane number. Hydro-upgrading processes, such as the Unicracking process by UOP (U.S. Pat. No. 5,026,472), aim at diesel with high cetane number. The process has good aromatic hydrocarbon hydrogenation saturation performance and ring-opening selectivity, high conversion of aromatic hydrocarbons, and the higher cetane number improvement and higher diesel yield. The light oil type hydrocracking is to provide reformed naphtha fraction or gasoline fraction by refining light diesel components and then carrying out violent saturation hydrogenation, which process also has the problem of low yield of the conversion from raw materials into aromatic hydrocarbons. If naphtha fraction is used for reforming aromatics, the cycloalkanes and paraffins produced after over-saturation need to be converted to aromatics in the reformer, which is not an economical route. The light oil hydrocracking process as described in CN101684415 does not directly produce aromatics, and the maximum potential content of aromatics of the heavy naphtha is only 57%.

CN1955262A describes a two-stage hydrocracking process, the hydrocracking catalyst of which contains noble metals of Pt and/Pd and non-noble metals, as well as Y zeolite and alumina, and the feedstock is LCO. However, the maximum potential content of aromatics of the naphtha products is only 76.8%, and the purity of the aromatic hydrocarbon is not high, which cannot meet the requirements of an aromatic hydrocarbon integrated unit. CN103897731A describes a process of producing light aromatics by mixing catalytic cracking diesel and $C_{10}^+$ distillate oil, wherein the product is cut through hydrofining and hydrocracking, the fraction more than 195° C. is used as a blending component for clean diesel, the fraction less than 195° C. is fed into an aromatics plant to produce light aromatics and blending components of clean gasoline, and the yield of aromatic products is relatively low.

In the existing LCO conversion technology, heavy tail oil is discharged as a diesel component or is partially recycled to the hydrofining reactor, and cannot be effectively and completely used for increasing the yield of light aromatic hydrocarbons.

Moreover, the hydrofining reaction on metal sulfide type hydrofining catalyst needs to be carried out under harsh operating conditions involving high temperature and high pressure, wherein the reaction is limited by thermodynamic equilibrium, the selectivity of the partial saturation reaction of the polycyclic aromatic hydrocarbon is poor, and the aromatic hydrocarbon retention rate after hydrofining of LCO is lower than 90%. The content of polycyclic aromatic hydrocarbons in heavy tail oil from production of light aromatic hydrocarbons by diesel is more than 90%, the content of sulfur and nitrogen is low, and the recycle back to a hydrofining reactor can cause the problems of over saturation and aromatic hydrocarbon loss.

SUMMARY OF THE INVENTION

Aiming at the problems in the prior art, the inventors carry out a series of researches and discover that a LCO stream can be subjected to hydrofining and impurity separation, followed by selective conversion reaction including hydrocracking, the mixed aromatic hydrocarbons generated can be separated sequentially into benzene-toluene, xylene, a stream containing $C_9$ aromatic hydrocarbons and $C_{10}$ aromatic hydrocarbons, and bottom heavy tail oil rich in $C_{10}+$ heavy aromatics; wherein the bottom heavy tail oil is fed into a post-saturation selective reactor, and subjected to high-selectivity hydrogenation saturation under the conditions of low temperature and low pressure to provide a product having one benzene ring, which is then fed to a selective conversion reaction, so as to achieve the full-cut conversion of producing light aromatic hydrocarbon from LCO, which results in high yields of the light aromatic hydrocarbons.

A light aromatic hydrocarbon according to the present invention refers to an aromatic hydrocarbon having a carbon number of less than or equal to 10, comprising C6 aromatic hydrocarbon, such as benzene; C7 aromatic hydrocarbons, such as toluene; C8 aromatic hydrocarbons, such as ethylbenzene, xylenes; C9 aromatic hydrocarbons, such as methylethylbenzene, propylbenzene, trimethylbenzene; C10 aromatic hydrocarbons, such as tetramethylbenzene, dimethylethylbenzene, diethylbenzene, and the like. Correspondingly, the $C_{10}+$ heavy aromatics refers to an aromatic hydrocarbon having a carbon number greater than 10.

One of the objects of the present invention is to provide a full conversion process of producing light aromatics from LCO.

The full conversion process of producing light aromatic hydrocarbon from LCO of the invention comprises the steps of:

1) feeding LCO into a first reaction zone for hydrofining, to provide a first stream;
2) feeding the first stream to a second reaction zone for selective conversion to provide a second stream, wherein the first stream is optionally subjected to impurity separation in a second separation zone before being fed to the second reaction zone;
3) subjecting the second stream to a first separation in a first separation zone, to provide a third stream comprising $C_{10}$+ heavy aromatics at the bottom of the first separation zone;
4) feeding the third stream to a post-saturation selective reaction zone for hydrogenation saturation, to provide a fourth stream;
5) recycling the fourth stream to the second reaction zone.

In an exemplary embodiment, the present invention provides a full conversion process of producing light aromatics from LCO fuel comprising the steps of:

1) feeding the LCO into a first reaction zone and contacts with a hydrofining catalyst in the presence of hydrogen to provide a first stream; the first reaction zone is subjected to hydrofining reaction;
2) feeding the first stream into a second reaction zone after removal of impurities, and contacting with a selective conversion catalyst in the presence of hydrogen to provide a second stream; wherein the selective conversion comprises a hydrocracking reaction;
3) separating the second stream to provide fractions including $C_6$-$C_8$ aromatic hydrocarbon stream, a stream containing $C_9$ aromatic hydrocarbons and $C_{10}$ aromatic hydrocarbons and a third stream containing $C_{10}$+ heavy aromatics;
4) feeding the third stream into a post-saturation selective reaction zone and contacting with a post-saturation selective catalyst in the presence of hydrogen, to provide a fourth stream; wherein the post-saturation selection is carried out by using a hydrogenation saturation reaction; and
5) recycling the fourth stream to the second reaction zone.

According to an aspect of the invention: in step 1) of the process of the invention, the LCO as raw oil is subjected to hydrofining in a first reaction zone in the presence of hydrogen, wherein the LCO stream and hydrogen are contacted with a hydrofining catalyst to perform desulfurization and denitrification, and a selective saturation reaction of polycyclic aromatic hydrocarbons resulting in one aromatic ring retained occurs. The hydrofining can be carried out in any manner by any process conventionally known in the art, and is not particularly limited, as long as the LCO fuel is subjected to desulfurization and denitrification, and the polycyclic aromatic hydrocarbon therein is subjected to hydrogenation saturation to retain one aromatic ring. The first stream obtained after hydrofining the LCO mainly comprises refined LCO with most of sulfur and nitrogen impurities removed, and a gas phase containing hydrogen sulfide and ammonia.

In step 1) of the process of the invention, LCO and hydrogen as raw oil are contacted with a hydrofining catalyst in a first reaction zone to carry out the hydrofining reaction.

The hydrofining reaction is technique of hydrofining a LCO well known in the art. The hydrofining reaction can be carried out under reaction conditions for LCO hydrofining known in the field; wherein the hydrofining catalyst can use any type of hydrofining catalyst existing in the field as long as the purpose of hydrofining the LCO in the step 1) can be fulfilled.

In step 1) of the process of the present invention, the conditions for the first reaction zone hydrofining reaction preferably comprise:

a volume ratio of hydrogen to oil of 500-3000 $Nm^3/m^3$, preferably 800-2000 $Nm^3/m^3$, and more preferably 1000-1500 $Nm^3/m^3$;
an inlet temperature of the reactor of 280-420° C., preferably 300-410° C., and more preferably 310-390° C.;
a partial pressure of hydrogen of 5-10 MPa, preferably 5-8 MPa, and more preferably 6-7 MPa; and/or
a space velocity of 0.5-2.0 $h^{-1}$, preferably 0.6-1.5 $h^{-1}$, more preferably 0.8-1.2 $h^{-1}$.

In the process of the present invention, the hydrofining catalyst of step 1) may preferably:

comprise the following components in parts by weight: a1) 60-99.9 parts, preferably 65-99.9 parts, preferably 70-99.9 parts, more preferably 75-99.9 parts of a support; and b1) a hydrogenating metal oxide, in an amount of 0.1 to 40 parts, preferably 0.1 to 35 parts, preferably 0.1 to 30 parts, and more preferably 0.1 to 25 parts; based on the total parts by weight of the support and the hydrogenating metal oxide.

In an exemplary embodiment, the support comprises, in parts by weight: 60-100 parts of alumina; and 0-40 parts of silica; based on the total weight of the alumina and the silica.

In an exemplary embodiment, the hydrogenating metal is at least one selected from the group consisting of nickel, cobalt, molybdenum, tungsten, and iron. The hydrogenating metal is sulfurized after being supported.

The hydrofining catalyst of the present invention can be prepared by any process known in the art, for example, the support can be prepared by extrusion, rolling or oil column shaping methods known in the art. In an embodiment, the catalyst may be prepared by shaping the support and then impregnating the metal.

Preferably, the first stream obtained by the hydrofining in step 1) is subjected to impurity separation, and after impurities such as hydrogen sulfide and ammonia contained in the first stream are separated, the impurity-separated first stream are separated is fed to the second reaction zone. The impurity separation preferably comprises gas-liquid separation and stripping of hydrogen sulfide to provide the impurity-separated first stream from which impurities such as hydrogen sulfide and ammonia are separated. More specifically, separation techniques conventional in the art, such as gas-liquid separation by injecting water into gas-phase to wash out ammonia, liquid-phase stripping to remove hydrogen sulfide, and the like, may be employed.

According to an aspect of the invention: in step 2) of the process of the present invention, the first stream after separation of impurities is subjected to selective conversion in a second reaction zone in the presence of hydrogen by reactions including hydrocracking. For example, the selective conversion includes a hydrocracking reaction that selectively converts a first stream obtained after hydrofining to a second stream. The second stream obtained in step 2) comprises mainly dry gases (including methane and ethane), $C_3$-C5 light hydrocarbons, a benzene-toluene fraction, a xylene fraction, a $C_9$-$C_{10}$ fraction and heavy tail oil. One purpose of the selective conversion in the step 2) is to perform hydrocracking with the proviso of retaining one aromatic ring of the polycyclic aromatic hydrocarbons in the heavy aromatics of the first stream, effectively control the saturation degree and the ring-opening position, and simultaneously enable the isomerization and cracking of the macromolecular non-aromatic hydrocarbons of the first stream; so as to maximize the production of light aromatics at an economical hydrogen consumption. The selective conversion reaction of this step may be carried out according to any process known in the art for hydrogenation reactions, provided that the first stream is selectively converted into the second stream.

In the process of the present invention, the reaction conditions for the second reaction zone of the step 2) can use the conventional reaction conditions for hydrocracking reaction in the field.

In the present invention, the reaction conditions for the second reaction zone preferably comprise:
a volume ratio of hydrogen to oil of 800-5000 $Nm^3/m^3$, preferably 1000-4000 $Nm^3/m^3$, and more preferably 1500-3000 $Nm^3/m^3$;
an inlet temperature of the reactor of 280-450° C., preferably 300-430° C., and more preferably 310-400° C.;
a partial pressure of hydrogen of 5-10 MPa, preferably 5-9 MPa, and more preferably 6-8 MPa; and/or
a space velocity of 0.5-2.0 $h^{-1}$, preferably 0.6-1.5 $h^{-1}$, more preferably 0.8-1.2 $h^{-1}$.

The selective conversion catalyst in step 2) may be any type of hydrocracking catalyst known in the art, as long as the above purpose of step 2) is achieved.

In order to achieve the conversion of the first stream to the second stream effectively, the selective conversion catalyst of the invention is preferably a catalyst provided in Chinese patent application ZL 201810153543.5. The contents of the Chinese patent application ZL 201810153543.5 are hereby incorporated by reference herein in their entirety.

A preferred selective conversion catalyst comprises:
in parts by weight: a2) 5-80 parts of solid acid zeolite; b2) 0.05 to 8 parts of a metal from Group VIII; c2) 3-25 parts of an oxide of metal from Group VIB; d2) 0.1-2 parts of a sulfide of metal from Group VIB; e2) 20-95 parts of a first binder; the weight parts of the components being based on the total part by weight of the catalyst. The selective conversion catalyst of the present invention may comprise, in addition to the above main components, other auxiliary agents commonly used for catalysts in the art, such as diatomaceous earth, activated clay, and the like. The useful amount may be a conventional amount.

Preferably, the solid acid zeolite is at least one of mordenite, β-zeolite, ZSM zeolite, EU-1 zeolite, SAPO zeolite and Y zeolite.

Preferably, the solid acid zeolite has a crystallite diameter of less than 500 nm, preferably less than 400 nm, more preferably less than 300 nm, more preferably less than 200 nm.

Preferably, the solid acid zeolite has a silicon-aluminum molecular ratio of 10-500, preferably 10-200, more preferably 11-80, and more preferably 20-60.

Preferably, the metal from Group VIII is at least one of platinum, palladium, cobalt, nickel and iridium.

Preferably, the oxide of metal from Group VIB is at least one of molybdenum oxide and tungsten oxide.

Preferably, the sulfide of metal from Group VIB is at least one of molybdenum sulfide and tungsten sulfide.

Preferably, the first binder is at least one of alumina, a silica-alumina composite, a titania-alumina composite, and a magnesia-alumina composite.

The selective conversion catalyst of the present invention may be prepared by any method known in the art, for example, the support may be prepared by extrusion, rolling or oil column shaping, and the like. In an embodiment, the catalyst may be prepared by shaping the support and then impregnating the metal. In an embodiment, the selective conversion catalyst may be prepared by a process comprising the steps of:
mixing the solid acid zeolite with a first adhesive, then kneading, extruding, baking at 60-150° C., and calcinating in an air atmosphere at 500-600° C. for 3-6 hours, to provide the required catalyst support;
preparing a composite metal aqueous solution of a metal compound of Group VIII and a metal compound of Group VIB, impregnating the catalyst support by the solution through an isometric impregnation method, baking at 60-150° C., and calcinating in an air atmosphere at 450-520° C. for 1-4 hours, to provide a catalyst precursor; and
reducing the catalyst precursor to 400-500° C. in the presence of hydrogen, and keeping the temperature for 2-24 hours (pre-reduction), followed by cooling to 300-380° C., injecting a vulcanizing agent for vulcanization for 4-24 hours, to provide the required hydrocracking catalyst.

According to an aspect of the invention, in step 3) of the process of the invention, the second stream is subjected to a first separation in a first separation zone, and the $C_6$-$C_8$ aromatic stream obtained comprises at least fractions of benzene, toluene, xylene, etc.

For the process according to the invention, in step 3), the first separation of the second stream preferably comprises gas-liquid separation, and rectification of the second stream. More preferably, the benzene-toluene fraction obtained after the rectification is subjected to extraction separation.

Specifically, the second stream is subjected to gas-liquid separation to separate out a dry gas and a liquid phase, wherein the dry gas is discharged outside, and the liquid phase is fed to a depentanizer for depentanization. The depentanization separates out a light fraction of C3-C5 hydrocarbons for discharge outside and a depentanizer bottom stream, which depentanizer bottom stream is fed into a deheptanizer. The deheptanizer separates out a stream rich in a benzene-toluene fraction and a deheptanizer bottom stream, which deheptanizer bottom stream is fed to a xylene column. The xylene column separates out a mixed xylene product and a xylene-removed bottom stream, which xylene-removed bottom stream is subjected to removal of heavy aromatics. The removal of heavy aromatics removal separates out a C9-C10 stream for discharge outside and a third stream separated from the bottom. The third stream is a heavy tail oil containing $C_{10}$+ heavy aromatics. The heavy tail oil is fed to a post-saturation selective reactor. The deheptanizer separates out a stream rich in benzene-toluene fraction, which stream is preferably subjected to extraction to separate out pure benzene-toluene mixed aromatic hydrocarbon, while the non-aromatic hydrocarbons separated by extraction is discharged outside. The above-described gas-liquid separation and rectification can be carried out by extraction and rectification methods commonly used in the art. The aromatic content in the third stream obtained by separating the second stream obtained by the selective conversion is preferably higher than the non-aromatic content; wherein the third stream of the present invention more preferably has an aromatics content of 80 wt % or more, most preferably 90 wt % or more.

According to an aspect of the invention, in step 4) of the process of the invention, the third stream containing $C_{10}$+ heavy aromatics obtained in step 3) is subjected to a high-selectivity hydrogenation saturation reaction in a post-saturation selective reaction zone in the presence of hydrogen at a low temperature under a low pressure, so as to provide a product having one benzene ring, forming a fourth stream containing the product, namely a fraction with a distillation point of more than 210° C. The hydrogenation saturation may be carried out according to any known method conventionally known in the art, as long as the effect of the post-saturation selective reaction described above can be achieved.

The hydrogenation saturation in the post-saturation selective reaction zone in step 4) of the process is preferably a liquid hydrogenation reaction, so as to simplify the flow chart, reduce the equipment, and reduce energy consumption. The reaction conditions may be those for conventional hydrogenation saturation reactions in the art, and preferably comprise:

a volume ratio of hydrogen to oil of 200-3000 $Nm^3/m^3$, preferably 300-1500 $Nm^3/m^3$, and more preferably 300-1000 $Nm^3/m^3$;

an inlet temperature of the reactor of 100-300° C., preferably 120-280° C., and more preferably 150-250° C.;

a partial pressure of hydrogen of 1.0-4.0 MPa, preferably 1.2-3.0 MPa; and/or a space velocity of 0.1-5.0 $h^{-1}$, preferably 0.5-4.0 $h^{-1}$, more preferably 0.6-2.0 $h^{-1}$.

In step 4), the third stream is contacted with the post-saturation selective catalyst in the post-saturation selective reaction zone to perform a hydrogenation saturation reaction, wherein the post-saturation selective catalyst may be a hydrogenation saturation catalyst existing in the art, as long as the purpose of hydrogenation saturation in step 4) is achieved. For example, the catalyst for hydrogenation saturation of aromatic hydrocarbon described in CN 103041832A can be used.

The post-saturation selective catalyst of step 4) according to the invention may comprise:

in parts by weight: a3) 10-90 parts of amorphous silica-alumina, wherein the content of silica is 3-20 wt %; b3) 0.1 to 5.0 parts of a metal from Group VIII; c3) 5-80 parts of a second binder; based on the total weight of the amorphous silica-alumina, the metal from Group VIII and the second binder.

In an embodiment, the metal from Group VIII is at least one selected from the group consisting of platinum, palladium, cobalt, nickel and iridium.

In an embodiment, the second binder is selected from alumina.

The post-saturation selective catalyst of the present invention can be prepared by any method known in the art. For example, the support can be prepared by extrusion, rolling ball or oil column shaping and the like in the art. In an embodiment, the catalyst may be prepared by shaping the support and then impregnating the metal.

For the full conversion process of producing light aromatic hydrocarbon from LCO, the LCO serving as raw oil can come from a catalytic cracking device in the field, which has an initial boiling point of 160-210° C. The composition of the LCO is not particularly limited, and the LCO may be derived from crude oils of different places of origin and have different compositions. By way of example, however, the LCO fuel contains predominantly paraffinic, cycloalkanes, olefins, sulfur-containing hydrocarbons, nitrogen-containing hydrocarbons, $C_{11}+$ alkylbenzenes, and polycyclic aromatic hydrocarbons. Amongst others, the content of $C_{11}+$ alkylbenzene is 10-40 wt %, the content of polycyclic aromatic hydrocarbon is 15-50 wt %, the content of sulfur is 200-15000 wt ppm, the content of nitrogen is 100-1500 wt ppm, and the rest are high boiling point alkanes, cycloalkanes and olefins.

Another purpose of the invention is to provide a device for the full conversion process of producing light aromatic hydrocarbons from LCO.

The invention provides a device for producing light aromatic hydrocarbon from LCO, comprising:

a first reaction zone for hydrofining; configured to receive the LCO and to discharge a first stream;

a second reaction zone for selective conversion (including hydrocracking); configured to receive the first stream and to discharge a second stream;

a first separation zone; configured to receive the second stream; and to discharge the third stream at the bottom;

a post-saturation selective reaction zone for hydrogenation saturation; configured to receive the third stream and to discharge a fourth stream; and a first pipeline; configured to recycle the fourth stream to the second reaction zone.

In an embodiment, the device for producing light aromatics from LCO fuel comprises:

a first reaction zone; configured to receive the LCO and to discharge a first stream;

a second reaction zone; configured to receive the first stream and discharge a second stream;

a first separation zone; configured to receive the second stream; and to discharge fractions comprising the $C_6$-$C_8$ aromatic hydrocarbon stream, a stream containing $C_9$ aromatic hydrocarbons and $C_{10}$ aromatic hydrocarbons, and a third stream containing $C_{10}+$ heavy aromatics;

a post-saturation selective reaction zone; configured to receive the third stream and to discharge a fourth stream;

a first pipeline; configured to recycle the fourth stream to the second reaction zone.

Specifically, in an Embodiment:

for an embodiment of the device of the present invention, the first reaction zone is equipped with a hydrofining unit wherein the hydrofining reactor employed is a fixed bed reaction system. Specifically, a fixed bed reaction system known in the art may be used, and a fixed bed reaction system equipped with a hydrogen recycling system is more preferable. The hydrofining reactor may have an inlet temperature of 250-450° C.

For an embodiment of the device of the present invention, the second reaction zone is equipped with a hydrocracking reactor for selective conversion, wherein the hydrocracking reactor used is a fixed bed reaction system. Specifically, a fixed bed reaction system known in the art may be used, and a fixed bed reaction system equipped with a hydrogen recycling system is more preferable. The selective conversion (hydrocracking) reactor may have an inlet temperature of 280-450° C.

For an embodiment of the device of the present invention, the post-saturation selective reaction zone is equipped with a hydrosaturation unit, wherein the post-saturation selective reactor used is a fixed bed reaction system; more preferably a liquid hydrogenation fixed bed reaction system without a hydrogen recycling system. Specifically, a fixed bed reaction system known in the art can be used. The post-saturation (hydrosaturation) may have an inlet temperature between 100° C. and 300° C., and a partial pressure of hydrogen between 1.0 and 4.0 MPa.

For an embodiment of the device of the present invention, the first separation zone comprises a gas-liquid separator and a rectifying column, optionally connected in sequence, wherein the rectifying column preferably comprises a depentanizer (first rectifying column), a deheptanizer (second rectifying column), a xylene-removal column (third rectifying column) and a heavy aromatics removal column (fourth rectifying column), optionally connected in sequence, for sequentially separating fractions comprising a stream rich in benzene-toluene fraction, a xylene stream, the stream containing $C_9$ aromatic and $C_{10}$ aromatic hydrocarbons, and the third stream containing $C_{10}+$ heavy aromatics.

Further preferably, the second stream is fed to a gas-liquid separator to separate out a dry gas stream and a liquid phase stream, wherein the liquid phase stream is fed to a depentanizer to separate out a C3-C5 light hydrocarbon stream at the top of the depentanizer and a depentanizer bottom stream, which depentanizer bottom stream is fed to a deheptanizer. The deheptanizer separates out a stream rich in benzene-toluene fraction at the top and a deheptanizer bottom stream. Preferably, the stream rich in benzene-toluene fraction is fed to an extraction device, to separate out pure benzene-toluene mixed aromatic hydrocarbons, while the non-aromatic hydrocarbons separated by extraction are discharged outside. The deheptanizer bottom stream is fed into a xylene column to directly separate out a mixed xylene product and a xylene column bottom stream. The xylene column bottom stream is fed into a heavy aromatics column, from which a C9-C10 is separated at the top for discharge outside and a third stream is separated at the bottom. The third stream is fed to a post-saturation selective reactor. The extraction and rectification can by carried out with extraction and rectification method commonly used in the field. The gas-liquid separator, the rectifying column and the extraction device can be the conventional equipment in the field.

In an embodiment of the device according to the invention, a second separation zone is arranged between the first reaction zone and the second reaction zone for separating impurities comprising sulfides and/or nitrides in the first stream. The second separation zone is configured to receive the first stream and to discharge a gas phase, a hydrogen sulfide and ammonia stream and an impurity-separated first stream. The separation device of the second separation zone can be a separation device conventionally used in the field, such as a gas-liquid separator (equipped with wash out of ammonia by injecting water in gas-phase), a stripping device (such as a stripping column of a liquid phase stripping hydrogen sulfide device) and the like.

The process of the invention removes impurity sulfur and nitrogen in the LCO stream from a catalytic cracking device by hydrofining the LCO stream through a first reaction zone, and subjects fused ring aromatic hydrocarbon and polycyclic aromatic hydrocarbon therein to selective hydrogenation saturation reaction, by which hydrogenation is carried out until only products having one aromatic ring such as tetra-hydronaphthalene, indene and polyalkylbenzene are retained. Then the process stream is fed to a second reaction zone after impurities being optionally separated, for hydrocracking reaction of selective conversion, to generate a stream rich in light aromatic hydrocarbons such as benzene, toluene, xylene, $C_9$ aromatic hydrocarbons, $C_{10}$ aromatic hydrocarbons, and the like. Then after removing light components before benzene benzene-toluene, xylene, $C_9$ aromatic hydrocarbons, $C_{10}$ aromatic hydrocarbons and bottom heavy tail oil (mainly containing heavy aromatics) are sequentially separated from the product stream. The bottom heavy tail oil is fed into a post-saturation selective reactor, for high-selectivity hydrogenation saturation under the conditions of low temperature and low pressure, to provide a product having one aromatic ring retained. The product is fed to a second reaction zone for a hydrocracking reaction of selective conversion, so as to achieve a full conversion process of producing light aromatic hydrocarbon from LCO. By the inventive process, the yield of the light aromatic hydrocarbon is improved, the loss of aromatic hydrocarbon is reduced, and the hydrogen consumption is reduced. The process solves the problems of the prior art well, and achieves good technical effect for increasing the yield of aromatic hydrocarbon products.

In the technical solution of the invention, through hydrofining in the first reaction zone, the LCO stream has a saturation rate of polycyclic aromatic hydrocarbon of more than 50%, a sulfur content reduced to less than 100 ppm, a nitrogen content reduced to less than 15 ppm, and a final distillation point reduced by more than 10° C. The LCO stream is converted into monocyclic aromatic hydrocarbons having ten or less carbon atoms after sequentially subjecting to the hydrofining device in the first reaction zone and the selective conversion device in the second reaction zone, with a conversion rate of more than 50%. The stream after the post-saturation selective reactor shows a high hydrogenation saturation selectivity, with a retention rate of the aromatic hydrocarbon more than 98%.

Compared with the prior art, the technical solution of the invention adopts a two-stage process of hydrofining-selective conversion, with two catalysts used in two stages in series (hydrofining catalyst and selective conversion catalyst), which comprises hydrofining, selective conversion and a post-saturation process of heavy tail oil. By the invention, the technical problems of incomplete conversion of full-range LCO and low yield of light aromatic hydrocarbon in the conversion process in the prior art is solved. The heavy tail oil from the production of light aromatic hydrocarbon by LCO is fed into a post-treatment reactor, for a selective saturation reaction under the conditions of mild pressure and temperature. The selectivity of hydrogenation saturation is greatly improved to more than 98% or even higher, such that the problem of excessive hydrogenation saturation is solved; which also helps to reduce the hydrogen consumption of cracking reaction which takes place when the non-aromatic hydrocarbon generated by over-hydrogenation into the selective conversion reactor. The process improves the technical and economic indexes of the integral process of producing light aromatic hydrocarbon by LCO, and realizes the full-fraction conversion of the LCO. Compared with a conventional two-stage process of hydrofining-selective conversion to produce light aromatic hydrocarbon by LCO, the yield of benzene, toluene, xylene and monocyclic light aromatics such as $C_9$ and $C_{10}$ can be improved by at least 2% or more, preferably 5% or more.

DESCRIPTION OF DRAWINGS

FIG. 1 is a schematic process flow chart of the present invention for a full conversion process of producing light aromatics from LCO.

DESCRIPTION OF THE REFERENCE SIGNS 1 denotes raw material oil-LCO
2 denotes a first reaction zone
3 denotes an outlet stream from the first reaction zone—the first stream
4 denotes a gas-liquid separator 5 denotes a gas phase stream containing hydrogen sulfide and ammonia
6 denotes a liquid phase stream after gas-liquid separation
7 denotes a stripping column for hydrogen sulfide
8 denotes a stripped stream containing hydrogen sulfide
9 denotes hydrofined LCO after removing hydrogen sulfide—the first stream with impurities separated out
10 denotes a selective conversion reactor
11 denotes a product of the selective conversion reaction—the second stream
12 denotes a first separation zone, comprising, for example, a gas-liquid separator, a depentanizer, a deheptanizer, a xylene column, a heavy aromatics column and the like rectifying columns, and a benzene-toluene fraction extraction device
13 denotes a stream of dry gas and C3-C5 light hydrocarbons separated from the first separation zone
14 denotes a benzene-toluene stream separated from the first separation zone
15 denotes a xylene stream separated from the first separation zone
16 denotes a stream containing $C_9$ aromatic hydrocarbons and $C_{10}$ aromatic hydrocarbons separated from the first separation zone
17 denotes a heavy tail oil stream separated from the first separation zone—the third stream
18 denotes a post-saturation selective reactor
19 denotes an outlet stream from the post-saturation selective reactor—the fourth stream
20 denotes a second separation zone (in the dotted line frame).

EMBODIMENTS

The present invention will be described in detail with reference to the Drawings and Examples, whilst it should be understood that the following Examples are merely illustrative of the present invention and should not be taken as limiting the scope of the present invention. Instead, those skilled can realize that modifications and variations thereof that would occur to those skilled in the art upon reading the present disclosure are still covered by the protection scopes of the invention.

All publications, patent applications, patents, and other references mentioned in this specification are herein incorporated by reference in their entirety. Unless defined specifically, all technical and scientific terms used herein have the same meaning as commonly understood by those skilled in the art to which this invention belongs. In case of conflict, the present specification, including definitions, will control.

When the present specification mentions a material, substance, method, step, device, or component, etc. with the derivative words "known to those skilled in the art", "prior art" or the like, the term derived is intended to cover those conventionally used in the field of the present application, but also cover those that are not currently known, whilst will become known in the art to be useful for the similar purposes.

The endpoints of the ranges and any values disclosed in the text of the present application are not limited to the precise range or value, but should be understood to encompass values close to these ranges or values. For numerical ranges, each range between its endpoints and individual point values, and each individual point value can be combined with each other to provide one or more new numerical ranges, and such numerical ranges should be construed as specifically disclosed herein. In the following, the various technical solutions can in principle be combined with each other to provide new technical solutions, which should also be regarded as specifically disclosed herein.

The preferred embodiments of the present invention have been described in detail; however, the present invention was not limited to the specific details of the above embodiments, and various simple modifications may be made to the technical solution of the present invention within the technical idea of the present invention, and these simple modifications were all within the protection scope of the present invention.

It should be noted that, the various features to be described in the embodiments below may be combined in any suitable manner, and in order to avoid unnecessary repetition, the present invention does not separately describe various possible combinations.

In addition, any combination of the various embodiments of the present invention can be made, and the same should be considered as the content of the present invention as long as the idea of the present invention was not violated.

Unless otherwise specified specifically, reference to pressure in this specification denotes a gauge pressure.

Unless otherwise specified specifically, reference to space velocity in this specification denotes a liquid hourly space velocity LHSV.

Unless otherwise specified specifically, all percentages, parts, ratios, etc. involved in this specification are indicated by weight, unless the basis on weight does not conform to the conventional understanding by those skilled in the art.

FIG. 1 is a schematic process flow chart of an exemplary embodiment of the process of producing light aromatic hydrocarbons from LCO fuel according to the present invention, in which various conventional devices such as pumps, compressors, heat exchangers, extraction devices, hydrogen pipelines, etc. are omitted, whilst such devices are well known to those skilled in the art. As shown in FIG. 1, the flow of an exemplary embodiment of the process of the present invention is described in detail as follows:

The LCO 1 serving as raw material oil is fed into a hydrofining device of the first reaction zone 2, to provide hydrofined LCO containing hydrogen sulfide and ammonia, namely the first reaction zone outlet stream 3 (the first stream); the first stream is fed to a gas-liquid separator 4 and a hydrogen sulfide stripping column 7 of the second separation zone 20, to separate out hydrogen sulfide and ammonia (through a gas phase stream 5 containing hydrogen sulfide and ammonia, and a stripped stream 8 containing hydrogen sulfide) obtained by denitrification and desulfurization in the hydrofining process, so as to provide an impurity-separated first stream 9. This stream is fed into the selective conversion device of the second reaction zone 10. A second reaction zone outlet stream 11 (the second stream), rich in light aromatic hydrocarbons such as benzene, toluene and xylene, C9A and C10A fractions, and heavy tail oil, is fed into a first separation zone 12, and is separated to provide stream 13 of dry gas and C3-C5 light hydrocarbons, a benzene-toluene stream 14, a xylene stream 15, a stream 16 containing $C_9$ aromatic hydrocarbons and $C_{10}$ aromatic hydrocarbons and a third stream 17 of a heavy tail oil containing $C_{10}$+ heavy aromatics. The third stream 17 is fed into the post-saturation selective reactor 18 of the post-saturation selective reaction zone, and the post-saturation selective reactor outlet stream 19 (the fourth stream), without separation, is recycled to the selective conversion device of the second reaction zone 10.

Specifically, the first separation zone 12 comprises a gas-liquid separator, a depentanizer, a deheptanizer, a xylene column, a heavy aromatics column, and other rectifying columns, and a benzene-toluene fraction extraction device (not shown in the FIGURE), connected in series.

The composition analysis of the catalysts involved in the present invention is carried out by analytical methods known in the art. For example, the composition of the catalyst can be analyzed by ICP (inductively coupled plasma) and XRF (X-ray fluorescence) methods for the selective conversion catalyst. The composition ratio of the metal oxide and the metal sulfide, of Group VIB, is determined by XPS (X-ray photoelectron spectroscopy). ICP is measured using a Varian 700-ES series XPS instrument. XRF is measured using a Rigaku ZSX 100e model XRF instrument. XPS test conditions comprise: a Perkin Elmer PHI 5000C ESCA model X-ray photoelectron spectrometer, using an Mg K excitation light source, an operation voltage of 10 kV, a current of 40 mA, and a vacuum degree of 4.0×10−8 Pa.

In the invention, the family composition of the LCO and the hydrofined LCO, as well as the family composition of the heavy tail oil and the selectively saturated heavy tail oil, is analyzed (multidimensional chromatographic analysis) using a full two-dimensional gas chromatography/high-flux time-of-flight mass spectrometer (GCxGC-TOFMS) from LECO company, America.

In the present invention, the composition of the reactant stream (e.g., selectively conversed product, etc.) is determined by gas chromatography. The chromatography model is Agilent 7890A, equipped with an FID detector, an FFAP capillary chromatographic column being used for separation. The chromatographic column is operated at temperature-programmed model, with an initial temperature of 90° C., kept for 15 minutes, then heated to 220° C. at the rate of 15° C./minute and kept for 45 minutes.

In the process of the invention, the retention rate of aromatic hydrocarbon in the hydrofining and selective saturation (post-saturation) processes is calculated as follows:

$$\text{Retention rate of aromatics} = \frac{\text{aromatic content in the product from hydrofining or selective saturation}}{\text{aromatic content in the raw material for hydrofining or selective saturation}} * 100\% \quad \text{(ii)}$$

The yield of monocyclic light aromatics such as benzene-toluene, xylene, C9A aromatics, C10A aromatics and the like is calculated as follows:

$$\text{Yield of } BTX + C9A + C10A = \frac{\text{output of } BTX + C9A + C10A}{\text{amount of the raw materials}} * 100\%$$

The raw materials of catalysts for the inventive and comparative examples were each commercially available.

Comparative Example 1

A LCO was processed by a two-stage process of hydrofining-selective conversion, namely, the LCO serving as raw material oil was subjected to hydrofining and impurity separation followed by hydrocracking, and then the product of hydrocracking was subjected to gas-liquid separation and rectification systems, to provide products of benzene-toluene, xylene, $C_9A$ aromatic hydrocarbons and $C_{10}A$ aromatic hydrocarbons, heavy tail oil and the like through separation.

The process flow of comparative example 1 did not comprise the selective hydrosaturation of a heavy tail oil at >210° C. in a post-saturation selective reaction zone.

The analytical data of the LCO raw material and the hydrofined product were shown in Table 1, wherein the LCO had an aromatic content of 87.15 wt %. The hydrofining catalyst, selective conversion (hydrocracking) catalyst and the reaction conditions used were listed in

TABLE 1

| Item | Raw materials of LCO | Product from hydrofining |
|---|---|---|
| Density (4° C.) | 0.953 | 0.932 |
| Sulfur (wt ppm) | 1070 | 87 |
| Nitrogen (wt ppm) | 632 | 8.6 |
| Non-aromatic hydrocarbons (wt) | 10.85 | 20.62 |
| Monocyclic aromatic hydrocarbons (wt %) | 37.40 | 53.71 |
| Polycyclic aromatic hydrocarbons (wt %) | 51.75 | 25.67 |
| Distillation test (D-86) | ° C. | ° C. |
| Initial boiling point | 193 | 188 |
| 5% | 212 | 210 |
| 10% | 235 | 232 |
| 30% | 246 | 237 |
| 50% | 288 | 275 |
| 70% | 315 | 313 |
| 90% | 345 | 337 |
| End point of distillation | 372 | 363 |

TABLE 2

| | | |
|---|---|---|
| Catalyst of hydrofining | A1 | 3.0 wt % NiO-10.5 wt % $MoO_3$-12.7 wt % $WO_3$/73.8 wt % $Al_2O_3$ |
| | A1' | 3.1 wt % NiS-10.2 wt % $MoS_2$-13.2 wt % $WS_2$/73.5 wt % $Al_2O_3$ |
| Partial pressure of hydrogen for hydrofining | | 6.5 MPa |
| Reaction temperature of hydrofining | | 315° C. at inlet |
| LHSV space velocity of hydrofining | | 1.2 $h^{-1}$ |
| Ratio of hydrogen to oil of hydrofining | | 1500 (v/v) |
| Catalyst B1 of selective conversion | | 0.1 part of Pt/60 parts of USY zeolite-39.9 parts of $Al_2O_3$ |
| Partial pressure of hydrogen for selective conversion | | 7.0 MPa |
| Reaction temperature of selective conversion | | 340° C. at inlet |
| LHSV space velocity of selective conversion | | 1.0 $h^{-1}$ |
| Ratio of hydrogen to oil of selective conversion | | 1800 (v/v) |

Preparation of the hydrofining catalyst A1 used: 2 g of sesbania powder, 9 ml of nitric acid and 60 ml of water were added into 100 g of pseudo-boehmite, kneaded into a cluster and extruded into strips, maintained at room temperature for 24 hours, dried at 100° C. for 12 hours, and calcinated at 550° C. in air atmosphere for 3 hours, to provide a hydrofining catalyst support. 7.90 g of nickel nitrate hexahydrate, 8.71 g of ammonium molybdate, 9.18 g of ammonium metatungstate and 10 ml of aqueous ammonia were dissolved in water to provide 50 ml of a clear solution. 50 g of the hydrofining catalyst support was added into said 50 ml of solution to soak for 3 hours in an isovolumetric soaking mode, dried at a temperature of 110° C. for 12 hours, and calcinated at a temperature of 500° C. in an air atmosphere for 4 hours, to provide a hydrofining catalyst A1. The catalyst A1 comprised 3.0 wt % NiO—10.5 wt % $MoO_3$—12.7 wt % $WO_3$/73.8 wt % $Al_2O_3$, namely, comprising three metals of nickel, molybdenum and tungsten.

A cyclohexane solution containing 0.5% of carbon disulfide was injected into a fixed bed reactor loaded with the hydrofining catalyst A1, heated from room temperature to a vulcanization end point temperature of 360° C. according to a program of 10° C./h, and kept for 12 h to finish pre-vulcanization of the hydrofining catalyst, to provide a vulcanized hydrofining catalyst A1', which comprised: 3.1 wt % NiS-10.2 wt % $MoS_2$-13.2 wt % $WS_2$/73.5 wt % $Al_2O_3$ in which the metals from Group VIB and Group VIII were present in sulfided state.

The LCO and hydrogen were mixed and then fed into a hydrofining reactor to remove most of sulfur and nitrogen impurities therein, in which polycyclic aromatic hydrocarbons were saturated to be converted into hydrocarbons containing only one aromatic ring. Table 1 also listed the sulfur and nitrogen content, density, aromatic hydrocarbon content, and distillate distribution of the product from hydrofining.

The first stream obtained after hydrofining the LCO was subjected to impurity separation, comprising the steps of carrying out gas-liquid separation on the first stream, and stripping using nitrogen under normal pressure for 3 hours, to fully remove hydrogen sulfide dissolved in the first stream. The sulfur content and nitrogen contents of the hydrofined product (the impurity-separated first stream in liquid phase) were 87 ppm and 8.6 ppm, respectively. The retention rate of polycyclic aromatic hydrocarbons during the hydrofining was 89.04 wt %, calculated from the composition data of aromatics.

Table 2 also listed the composition of the selective conversion catalyst B1 used for the hydrocracking and the reaction conditions employed. The USY zeolite and alumina were kneaded, extruded and shaped, to provide the selective conversion catalyst support. Then, an appropriate amount of chloroplatinic acid was formulated into a clear solution, to soak the support in an isovolumetric soaking mode, dried, and calcinated in air at 500° C. for 2 hours, to provide a precursor of the selective conversion catalyst. The precursor of the selective conversion catalyst was reduced until 450° C. in the presence of hydrogen to provide the desired selective conversion catalyst B1, comprising: 0.1 part of Pt-60 parts of USY zeolite-39.9 parts of $Al_2O_3$. The catalyst bed was cooled to 340° C., and the hydrofined product after stripping (the impurity-separated first stream) was mixed with hydrogen, and fed into a selective conversion reactor, and the reaction product was fed to a gas-liquid separation and rectification system.

After gas-liquid separation and a rectification system, benzene-toluene, xylene, $C_9A$ aromatic hydrocarbons and $C_{10}A$ aromatic hydrocarbons were obtained through separation, and the yield of monocyclic light aromatic hydrocarbons such as benzene-toluene, xylene, $C_9A$ aromatic hydrocarbons and $C_{10}A$ aromatic hydrocarbons, was 21.48 wt % through calculation. The heavy tail oil at >210° C. had a yield of 38.27 wt %, a specific gravity of 0.935, and a sulfur and nitrogen content of respectively 19.5 ppm and 1.5 ppm. Multidimensional chromatographic analysis was carried out to provide a family composition of the third stream as follows: 41.98 wt % non-aromatic hydrocarbons, 26.38 wt % monocyclic aromatic hydrocarbons and 31.64 wt % polycyclic aromatic hydrocarbons.

Example 1

In the Example, a full conversion process of producing light aromatics from LCO was carried out according to the flow chart showed in FIG. 1. The LCO was subjected to hydrofining and impurity separation, followed by selective conversion (hydrocracking), and then the heavy tail oil at >210° C. was fed into a post-saturation selective reaction zone for a selective hydrosaturation, specifically:

The raw materials, the hydrofining catalyst, and the hydrofining reaction conditions were same as those in comparative example 1, and the selective conversion catalyst B2 (hydrocracking catalyst) and the selective conversion reaction conditions were shown in Table 3.

TABLE 3

| | |
|---|---|
| Selective conversion catalyst B2 | 3.50 parts of Ni-5.00 parts of $WO_3$-0.27 parts of $WS_2$/50 parts of β-zeolite-41.23 parts of $Al_2O_3$ |
| Partial pressure of hydrogen for the selective conversion | 7.0 MPa |
| Temperature for the selective conversion | 340° C. at inlet |
| LHSV space velocity for the selective conversion | 1.0 $h^{-1}$ |
| Ratio of hydrogen to oil for the selective conversion | 1600 (v/v) |

The composition of the selective conversion catalyst B2 and the reaction conditions used were listed in Table 3.

The selective conversion catalyst B2 was prepared as follows: 70 wt % of β-zeolite (with a silicon-aluminum molecular ratio SAR=25) and 30 wt % of alumina were kneaded, extruded and molded to provide the selective conversion catalyst support. Then, an appropriate amount of nickel nitrate and ammonium tungstate were formulated into a clear solution, to soak the support in an isovolumetric soaking mode, dried at 100° C., and calcinated in air at 500° C. for 2 hours, to provide a precursor of the selective conversion catalyst. The precursor of the selective conversion catalyst was reduced to 450° C. for 4 hours in the presence of hydrogen, cooled to 330° C., and then dimethyl disulfide was injected for vulcanization for 4 hours, to provide the desired selective conversion catalyst B2. Based on 100 parts by weight of the total weight of the catalyst, the catalyst B2 comprised: 3.5 parts of Ni-5.0 parts of $WO_3$-0.27 part of $WS_2$-50 parts of β-zeolite-41.23 parts of $Al_2O_3$.

The first stream obtained from the LCO after hydrofining was subjected to impurity separation, wherein the first stream was subjected to gas-liquid separation, and stripped with nitrogen for 3 hours under normal pressure, to fully remove hydrogen sulfide dissolved in the first stream. The hydrofined product after stripping (the impurity-separated first stream) was mixed with hydrogen, fed into a selective conversion reactor, and the reaction product was fed to a gas-liquid separation and rectification system.

After gas-liquid separation and a rectification system, benzene-toluene, xylene, C9A aromatic hydrocarbons and C1OA aromatic hydrocarbons were obtained through separation, and the yield of monocyclic light aromatic hydrocarbons such as benzene-toluene, xylene, C9A aromatic hydrocarbons and C10A aromatic hydrocarbons, was 32.27 wt % through calculation. The heavy tail oil at >210° C. (the third stream) had a yield of 24.75 wt %, a specific gravity of 0.957, and a sulfur and nitrogen content of respectively 25.4 ppm and 1.6 ppm. Multidimensional chromatographic analysis was carried out to provide a family composition of the third stream as showed in Table 4: 8.54 wt % non-aromatic hydrocarbons, 37.56 wt % monocyclic aromatic hydrocarbons and 53.90 wt % polycyclic aromatic hydrocarbons.

TABLE 4

|  | Heavy fraction at >210° C. |
| --- | --- |
| Density (4° C.) | 0.957 |
| Sulfur (wt ppm) | 25.4 |
| Nitrogen (wt ppm) | 1.6 |
| Non-aromatic hydrocarbons (wt %) | 8.54 |
| Monocyclic aromatic hydrocarbons (wt %) | 37.56 |
| Polycyclic aromatic hydrocarbons (wt %) | 53.90 |

The post-saturation selective catalyst C2 for treating the heavy tail oil at >210° C. comprised: 0.05 wt % Pt-0.15 wt % Pd-4.5 wt % $SiO_2$–95.3 wt % $Al_2O_3$ The post-saturation selective catalyst C2 was prepared as follows: a commercial amorphous silica-alumina material with 20 wt % of $SiO_2$ was mixed with pseudo-boehmite, then a peptizing agent of nitric acid, an extrusion aid of sesbania powder and an appropriate amount of water were added, kneaded, extruded and shaped, dried in air at 100° C. for 24 hours, and then calcinated in air at 550° C. for 4 hours, to provide the catalyst support. An appropriate amount of chloroplatinic acid and palladium chloride was dissolved in water to provide a metal impregnation solution, to soak the catalyst support in an isovolumetric soaking mode, dried in air at 80° C. for 48 hours, and then calcinated in air at 480° C. for 2 hours, to provide the post-saturation selective catalyst C2. The post-saturated selective catalyst C2 was reduced in the presence of hydrogen with a reduction end temperature of 450° C., and kept for two hours.

An oversaturated amount of hydrogen was dissolved in the heavy tail oil at >210° C. through a hydrogen mixer and was fed into a selective saturation reactor, with reaction conditions of: a volume ratio of hydrogen to oil of 450 $Nm^3/m^3$, a reactor inlet temperature of 180° C., a partial pressure of hydrogen of 1.5 MPa, and a volume space velocity of the feed of 1.0 $h^{-1}$. After the entire reaction system had been equilibrated, the analytical results for the products of the selective saturation were as shown in Table 5, wherein the sulfur and nitrogen contents were 16.8 ppm and 1.2 ppm, respectively. The retention rate of polycyclic aromatic hydrocarbons for the selective saturation process was 99.43 wt %, calculated from the aromatic composition data.

TABLE 5

|  | Heavy fraction at >210° C. |
| --- | --- |
| Density (4 °C) | 0.939 |
| Sulfur (wt ppm) | 16.8 |
| Nitrogen (wt ppm) | 1.2 |
| Non-aromatic hydrocarbons (wt %) | 8.96 |
| Monocyclic aromatic hydrocarbons (wt %) | 59.82 |
| Polycyclic aromatic hydrocarbons (wt %) | 31.22 |

The heavy tail oil at >210° C. after selective saturation was returned to the selective conversion reactor, and stable stream balance was established. After gas-liquid separation and a rectification system, benzene-toluene, xylene, C9A aromatic hydrocarbons and C1OA aromatic hydrocarbons were obtained through separation, and the yield of monocyclic light aromatic hydrocarbons such as benzene-toluene, xylene, C9A aromatic hydrocarbons and C10A aromatic hydrocarbons, was 46.35 wt % through calculation.

Example 2

In the Example, a full conversion process of producing light aromatics from LCO was carried out according to the flow chart showed in FIG. 1. The LCO was subjected to hydrofining and impurity separation, followed by selective conversion (hydrocracking), and then the heavy tail oil at >210° C. was fed into a post-saturation selective reaction zone for a selective hydrosaturation, specifically:

The raw materials, the hydrofining catalyst, and the hydrofining reaction conditions were same as those in comparative example 1, and the selective conversion catalyst B3 (hydrocracking catalyst) and the selective conversion reaction conditions were shown in Table 6.

TABLE 6

| Selective conversion catalyst B3 | 0.2 part of Pd-6.5 parts of Ni-4.2 parts of $MoO_2$-7.9 parts of $MoO3$-1.1 parts of $MoS_2$/35 parts of mordenite-10 parts of β-zeolite-11 parts of ZSM-5-24.1 parts of $Al_2O_3$ |
| --- | --- |
| Partial pressure of hydrogen for the selective conversion | 8.0 MPa |
| Temperature for the selective conversion | 360° C. at inlet |
| LHSV space velocity for the selective conversion | 1.2 $h^{-1}$ |
| Ratio of hydrogen to oil for the selective conversion | 2000 (v/v) |

The composition of the selective conversion catalyst B3 and the reaction conditions used were listed in Table 6.

The selective conversion catalyst B3 was prepared as follows: a hydrogen mordenite (SAR=45), hydrogen β-zeolite (SAR=25), hydrogen ZSM-5 (SAR=27) and pseudo-boehmite were fully mixed, kneaded, extruded, dried at 120° C., and calcinated in air atmosphere at 550° C. for 4 hours, to provide the required selective conversion catalyst support. Palladium chloride, nickel nitrate and ammonium molybdate were prepared into a tri-metal solution, to soak the catalyst support in an isovolumetric soaking mode, dried at 120° C. and then calcinated in an air atmosphere at 500° C. for 2 hours, to provide a precursor of the selective conversion catalyst. The precursor of selective conversion catalyst was reduced to 450° C. and kept for 8 hours in the presence of hydrogen, cooled to 330° C., and then dimethyl disulfide was injected for vulcanization for and keep 8 hours, to provide the desired selective conversion catalyst B3. Based on 100 parts by weight of the total weight of the catalyst, the catalyst B3 comprised: 0.2 part of Pd-6.5 parts of Ni-4.2 parts of $MoO_2$–7.9 parts of $MoO_3$–1.1 parts of $MoS_2$–35 parts of mordenite-10 parts of β-zeolite-11 parts of ZSM-5-24.1 parts of $Al_2O_3$.

The first stream obtained from the LCO after hydrofining was subjected to impurity separation: wherein the first stream was subjected to gas-liquid separation, and stripped with nitrogen for 3 hours under normal pressure, to fully remove hydrogen sulfide dissolved in the first stream. The hydrofined product after stripping (the impurity-separated first stream) was mixed with hydrogen, fed into a selective conversion reactor, and the reaction product was fed to a gas-liquid separation and rectification system.

After gas-liquid separation and a rectification system, benzene-toluene, xylene, C9A aromatic hydrocarbons and C1 OA aromatic hydrocarbons were obtained through separation, and the yield of monocyclic light aromatic hydrocarbons such as benzene-toluene, xylene, C9A aromatic hydrocarbons and C10A aromatic hydrocarbons, was 30.08 wt % through calculation. The heavy tail oil at >210° C. (the third stream) had a yield of 33.15 wt %, a specific gravity of 0.961, and a sulfur and nitrogen content of respectively 16.4 ppm and 0.8 ppm. Multidimensional chromatographic analysis was carried out to provide a family composition of the third stream as showed in Table 7: 7.58 wt % non-aromatic hydrocarbons, 38.12 wt % monocyclic aromatic hydrocarbons and 54.30 wt % polycyclic aromatic hydrocarbons.

TABLE 7

|  | Heavy fraction at >210° C. |
|---|---|
| Density (4° C.) | 0.951 |
| Sulfur (wt ppm) | 16.4 |
| Nitrogen (wt ppm) | 0.8 |
| Non-aromatic hydrocarbons (wt %) | 7.58 |
| Monocyclic aromatic hydrocarbons (wt %) | 38.12 |
| Polycyclic aromatic hydrocarbons (wt %) | 54.30 |

The post-saturation selective catalyst C3 for treating the heavy tail oil at >210° C. comprised: 0.10 wt % Pt-0.30% Pd-4.0 wt % ni-6.0 wt % $SiO_2$–89.6 wt % $Al_2O_3$. The post-saturation selective catalyst C3 was prepared as follows: a commercial amorphous silica-alumina material with 9% of $SiO_2$ was mixed with pseudo-boehmite, then a peptizing agent of nitric acid, an extrusion aid of sesbania powder and an appropriate amount of water were added, kneaded, extruded and shaped, dried in air at 100° C. for 24 hours, and then calcinated in air at 550° C. for 4 hours, to provide the catalyst support. Appropriate amounts of chloroplatinic acid, palladium chloride and nickel acetate were dissolved in water to provide a metal impregnation solution, to soak the catalyst support in an isovolumetric soaking mode, dried in air at 100° C. for 18 hours, then calcinated in air at 500° C. for 2 hours, to provide the post-saturation selective catalyst C3. The post-saturated selective catalyst C3 was reduced in the presence of hydrogen with a reduction end temperature of 450° C., and kept for two hours.

An oversaturated amount of hydrogen was dissolved in the heavy tail oil at >210° C. through a hydrogen mixer and was fed into a selective saturation reactor, with reaction conditions of: a volume ratio of hydrogen to oil of 600 $Nm^3/m^3$, a reactor inlet temperature of 150° C., a partial pressure of hydrogen of 2.0 MPa, and a volume space velocity of the feed of 1.5 $hour^{-1}$. After the entire reaction system had been equilibrated, the analytical results for the products of the selective saturation were as shown in Table 8, wherein the sulfur and nitrogen contents were 11.3 ppm and 0.6 ppm, respectively. The retention rate of polycyclic aromatic hydrocarbons for the selective saturation process was 99.63 wt %, calculated from the aromatic composition data.

TABLE 8

|  | Heavy fraction at >210° C. for selective saturation |
|---|---|
| Density (4° C.) | 0.942 |
| Sulfur (wt ppm) | 11.3 |
| Nitrogen (wt ppm) | 0.6 |
| Non-aromatic hydrocarbons (wt %) | 7.92 |
| Monocyclic aromatic hydrocarbons (wt %) | 66.35 |
| Polycyclic aromatic hydrocarbons (wt %) | 25.73 |

The heavy tail oil at >210° C. after selective saturation was returned to the selective conversion reactor, and stable stream balance was established. After gas-liquid separation and a rectification system, benzene-toluene, xylene, C9A aromatic hydrocarbons and C1 OA aromatic hydrocarbons were obtained through separation, and the yield of monocyclic light aromatic hydrocarbons such as benzene-toluene, xylene, C9A aromatic hydrocarbons and C10A aromatic hydrocarbons, was 47.98 wt % through calculation.

The invention claimed is:

1. A process of producing light aromatics from light cycle oil;
   comprising the steps of:
   1) feeding LCO into a first reaction zone for hydrofining, to provide a first stream: wherein the reaction conditions for the first reaction zone comprise: a volume ratio of hydrogen to oil of 500-3000 Nm3/m3; or an inlet temperature of a reactor of the first reaction zone of 280-420° C.; or a partial pressure of hydrogen of 5-10 MPa; or a space velocity of 0.5-2.0 h−1; or a combination thereof;
   2) feeding the first stream to a second reaction zone for selective conversion to perform hydrocracking with the proviso of retaining one aromatic ring of the polycyclic aromatic hydrocarbons in the heavy aromatics of the first stream, and simultaneously enable the isomerization and cracking of the macromolecular non-aromatic hydrocarbons of the first stream, to provide a second stream, wherein the first stream is optionally subjected to impurity separation in a second separation zone to remove impurities selected from hydrogen sulfide and ammonia before being fed to the second reaction zone;
   3) subjecting the second stream to a first separation in a first separation zone, to provide a third stream comprising $C_{10+}$ heavy aromatics at a bottom of the first separation zone comprising a gas-liquid separator and a rectifying column;
   4) feeding the third stream to a post-saturation selective reaction zone for hydrogenation saturation of $C_{10+}$ heavy aromatics, to provide a fourth stream comprising a product having one benzene ring, wherein the reaction conditions for the post-saturation selective reaction zone comprise: a volume ratio of hydrogen to oil of 200-3000 Nm3/m3; or an inlet temperature of reactor of the post-saturation selective reaction zone of 100-280° C.; or a partial pressure of hydrogen of 1.0-4.0 MPa; or a space velocity of 0.1-5.0 h−1; or a combination thereof;
   5) recycling the fourth stream to the second reaction zone, wherein the reaction conditions for the second reaction zone comprise: a volume ratio of hydrogen to oil of 800-5000 Nm3/m3;
   or an inlet temperature of reactor of the second reaction zone of 280-450° C.; or a partial pressure of hydrogen of 5-10 MPa; or a space velocity of 0.5-2.0 h−1; or a combination thereof.

2. The process according to claim 1, wherein:
   in addition to the third stream, the step 3) also provides fractions including $C_6$-$C_8$ aromatic hydrocarbon stream, and a stream containing $C_9$ aromatic hydrocarbons and $C_{10}$ aromatic hydrocarbons, wherein the $C_6$-$C_8$ aromatic hydrocarbon stream comprises at least one of benzene, toluene and xylene.

3. The process according to claim 1, wherein:
   in the step 2), the impurity separation is carried out comprising subjecting the first stream to gas-liquid separation and stripping of hydrogen sulfide.

4. The process according to claim 1, wherein:
   in the step 3), the first separation of the second stream comprises gas-liquid separation and rectification; and the rectification comprises depentanizing, deheptanizing, xylene removal and heavy aromatics removal; wherein a stream rich in a benzene-toluene fraction obtained from deheptanizing is subjected to an extraction separation.

5. The process according to claim 1, wherein: the reaction conditions for the first reaction zone comprise: a volume ratio of hydrogen to oil of 800-2000 Nm3/m3; or
an inlet temperature of the reactor of 300-410° C.; or a partial pressure of hydrogen of 5-8 MPa; or a space velocity of 0.6-1.5 h–1 or a combination thereof.

6. The process according to claim 1, wherein:
in the step 2), the selective conversion is carried out in the presence of a selective conversion catalyst comprising, in parts by weight: a2) 5-80 parts of solid acid zeolite; b2) 0.05 to 8 parts of a metal from Group VIII; c2) 3-25 parts of an oxide of metal from Group VIB; d2) 0.1-2 parts of a sulfide of metal from Group VIB; and e2) 20-95 parts of a first binder.

7. The process according to claim 6, wherein:
the solid acid zeolite is at least one of mordenite, β-zeolite, ZSM zeolite, EU-1 zeolite, SAPO zeolite and Y zeolite;
the metal from Group VIII is at least one of platinum, palladium, cobalt, nickel and iridium;
the oxide of metal from Group VIB is at least one of molybdenum oxide and tungsten oxide;
the sulfide of metal from group VIB is at least one of molybdenum sulfide and tungsten sulfide; and
the first binder is at least one of alumina, a silica-alumina composite, a titania-alumina composite, and a magnesia-alumina composite.

8. The process according to claim 1, wherein: the reaction conditions for the second reaction zone comprise: a volume ratio of hydrogen to oil of 1000-4000 Nm3/m3;
or an inlet temperature of the reactor of 300-430° C.; or a partial pressure of hydrogen of 5-9 MPa; or a space velocity of 0.5-2.0 0.6-1.5 h–1 or a combination thereof.

9. The process according to claim 1, wherein:
in the step 4), the hydrogenation saturation is carried out in the presence of a post-saturation selective catalyst, which comprises, in parts by weight: a3) 10-90 parts of amorphous silica-alumina, wherein the amorphous silica-alumina contains 3-20 wt % of silica; b3) 0.1 to 5.0 parts of a metal from Group VIII; and c3) 5-80 parts of a second binder;
the metal from group VIII is at least one selected from platinum, palladium, cobalt, nickel and iridium; and
the second binder is alumina.

10. The process according to claim 1, wherein: the reaction conditions for the post-saturation selective reaction zone for hydrogenation saturation comprise:
a volume ratio of hydrogen to oil of 300-1500 Nm3/m3; or an inlet temperature of the reactor of 120-280° C.; or a partial pressure of hydrogen of 1.2-3.0 MPa; or a space velocity of 0.5-4.0 h–1.

* * * * *